No. 890,795. PATENTED JUNE 16, 1908.
F. W. PUTSCH.
BOILER TUBE OR FLUE CUTTER.
APPLICATION FILED NOV. 25, 1907.
2 SHEETS—SHEET 2.
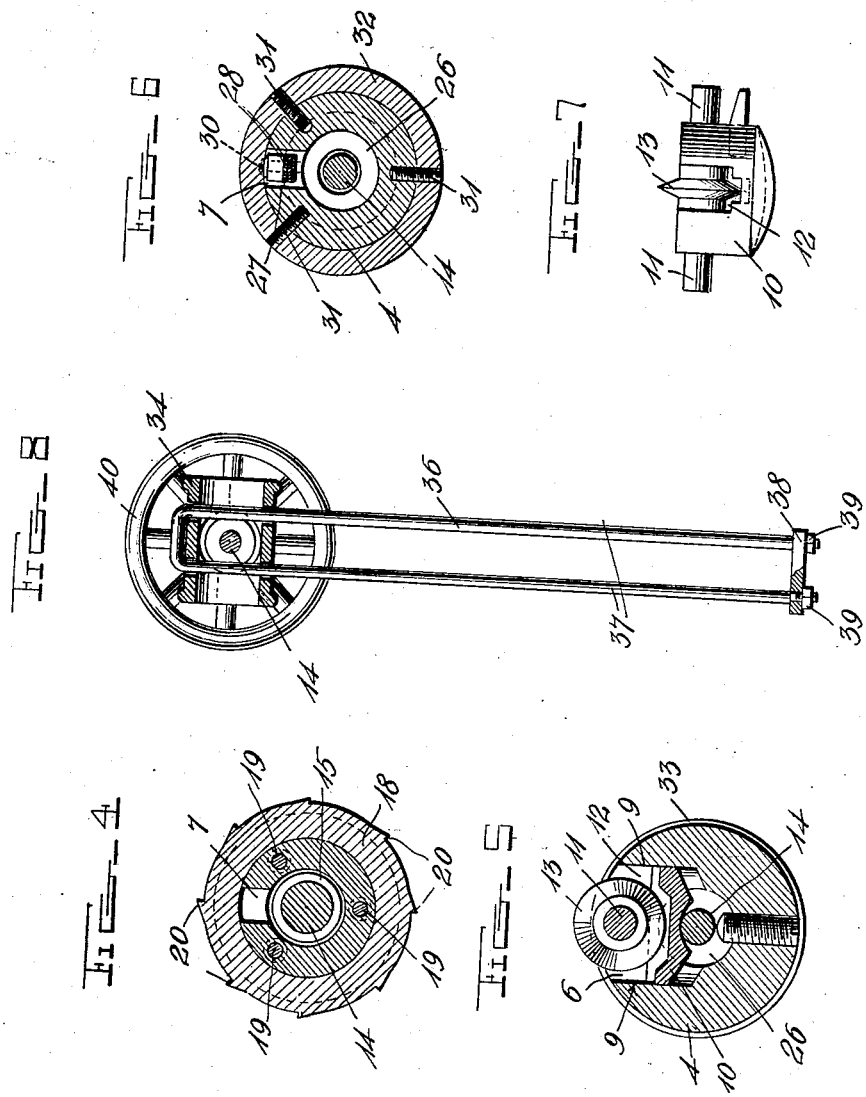
Witnesses
Inventor
F. W. Putsch

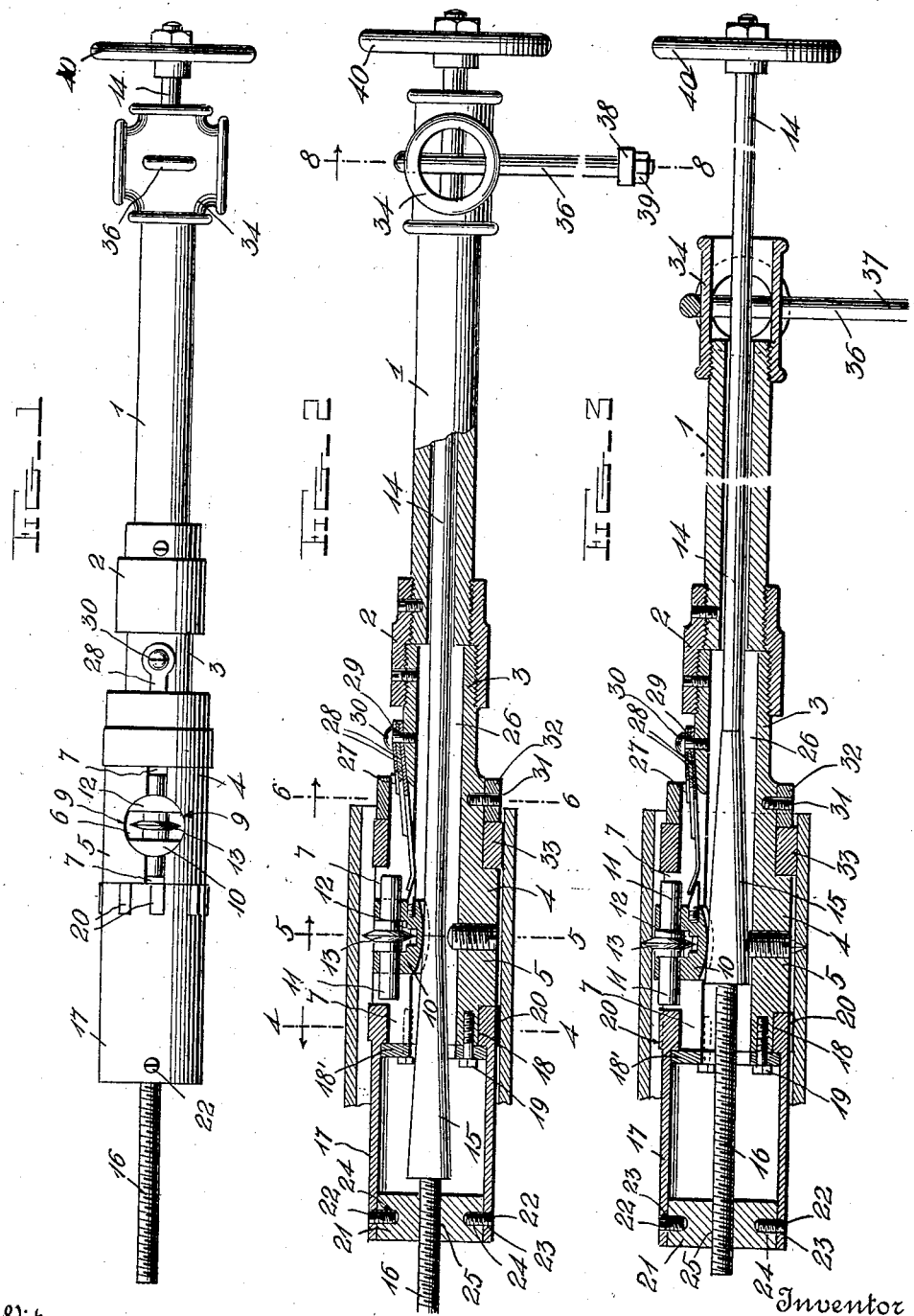

UNITED STATES PATENT OFFICE.

FREDRICH W. PUTSCH, OF SALINA, KANSAS.

BOILER TUBE OR FLUE CUTTER.

No. 890,795.  Specification of Letters Patent.  Patented June 16, 1908.

Application filed November 25, 1907. Serial No. 403,780.

*To all whom it may concern:*

Be it known that I, FREDRICH W. PUTSCH, a citizen of the United States, residing at Salina, in the county of Saline and State of Kansas, have invented certain new and useful Improvements in Boiler Tube or Flue Cutters; and I do declare the following to be a full, clear, and exact description of the invention, such as will enable others skilled in the art to which it appertains to make and use the same.

This invention relates to improvement in boiler tube or flue cutters.

The principal object is the production of a simple and efficiently operating device of this kind equipped with cutting means which may be adjusted to permit of the insertion of the device into a boiler tube or flue and after such insertion be adjusted to cut the tube or flue by a proper manipulation of the device.

With the foregoing and other objects in view, the invention consists of certain novel features of construction, combination and arrangement of parts, as will be more fully described and particularly pointed out in the appended claims.

In the accompanying drawings: Figure 1 is a plan view of the device constructed in accordance with the invention. Fig. 2 is a central longitudinal sectional view of the invention as applied. Fig. 3 is a similar view, showing the relative position of the parts after the cutting operation. Fig. 4 is a cross sectional view cut on the line 4—4 of Fig. 2.
Fig. 5 is a similar view, taken on the line 5—5 of Fig. 2. Fig. 6 is a cross sectional view taken on the line 6—6 of Fig. 1. Fig. 7 is a view in side elevation of the cutting member on an enlarged scale, and Fig. 8 is a cross section of the line 8—8 of Fig. 2.

Referring more particularly to the drawings, which are for illustrative purposes only, and therefore not drawn to scale, the numeral 1 indicates a suitable handle or body of preferably tubular form having coupled to its inner end by a coupling member 2, the inner reduced end or stem 3 of a suitable guide member 4. This member is of tubular form and is formed with a central cylindrical body portion 5 having a central guide opening 6 leading from the wall of its bore and being slotted at the ends of such opening, as at 7, the purpose of which will be disclosed. The walls of said opening are preferably formed with central inwardly curved recess portions 9 to conform with the curvature of the body of a carrier 10 arranged for movement in the central guide opening 6 of the body portion 5, said carrier having extending through it near its top an axle 11 the ends of which project or extend beyond the carrier and fit in the slots 7.

In carrying out the invention the top of the carrier is formed of a suitable recess or bifurcation 12 in which is arranged for rotation a cutting disk or member 13. An adjusting spindle 14 is arranged to extend through the handle and guide member. This spindle is provided intermediately of its ends, preferably near its outer end with a gradually tapered portion 15 and at the outer end of such portion with a threaded stem 16. A tubular sleeve 17 of uniform diameter throughout its length has riveted or otherwise secured to its inner end and inner face an annular band or ring 18, the internal diameter of which corresponds with the diameter of the outer reduced end portion of the guide member. Said sleeve is fitted in position by slipping the band or ring 18 over the outer reduced end portion of the guide member and fitting a fastening plate within the sleeve against the band or ring and fastening this plate to the outer end of said reduced end portion by fastening screws 19 or other equivalent means. Said sleeve has formed or fixed to its outer face at its inner or ring end a circumferential series of inclined teeth 20, the purpose of which will be disclosed. An end plate or disk 21 is arranged within and at the outer end of the tubular sleeve 17 and is removably maintained in position by fastening screws 22 adapted to be screwed in corresponding threaded apertures 23 in the sleeve and in corresponding threaded sockets 24 formed in the periphery of the end plate or disk, said disk being formed with a central threaded bore 25 for receiving the threaded stem of the adjusting member or spindle 14.

In carrying out the invention the bottom of the carrier is formed with a central longitudinal depression or groove 26 for receiving the tapered portion of the adjusting spindle, which permits of said spindle being moved longitudinally with greater facility. An inclined opening 27 is formed in the inner reduced portion of the guide member in which is adapted to be inserted or arranged a plurality of longitudinally disposed resilient elements or springs 28 of gradually increasing lengths, the longer of said elements projecting into the bore of the guide member and engages the inner end of an extension 28' extending over the adjacent end of the carrier axle, said extension constituting yieldable retaining means for retaining the carrier in position. The outer ends of said spring are provided with registering apertures 29 through which is adapted to be passed a fastening screw 30 adapted for screwed engagement with a threaded aperture formed in the inner reduced end or portion of the guide member.

Removably fixed to the inner reduced end portion of the guide member by fastening screws 31 or other equivalent means, and spaced a suitable distance from the inner end of the body portion 5 thereof is a collar or ring 32, said collar being preferably of a diameter to correspond with that of the body portion.

An annulus 33 is mounted for rotation between the collar or ring 32 and inner end of the cylindrical body portion of the guide member, said annulus being of slightly greater diameter than that of the body portion and collar or ring, the purpose of which will be shown.

A two-way coupling 34 is secured to the outer end of the handle 1 and is formed in its walls with laterally spaced apertures. The apertures of the upper wall being adapted for registration with those of the other wall.

The numeral 36 indicates a suitable handle which is fastened to the coupling by passing the side bars or members 37 thereof through the apertures of the coupling and screwing it in position by a fastening plate 38 having apertures for the reception of said side bars or members and nuts 39 adapted for screwed engagement with the fastening plate. A handle 40 in the form of a wheel is fixed to the outer end of the adjusting spindle in any suitable manner.

In practice, the spindle is turned or rotated in a left hand direction by the operator grasping the handle 40 thereof, which causes the spindle to move longitudinally in an upward direction. The larger end of the tapered portion 15 of the spindle is arranged at the rear end of the cutter so that as the spindle is moved longitudinally by turning the handle 40 the carrier will be raised. In the application of the invention the spindle is turned to the right until the carrier frame has been sufficiently lowered to permit of the insertion of the device into a boiler tube or flue. The handle is then turned to the left as before described, causing the carrier to move upwardly in the guide opening of the guide member until the cutting wheel or disk engages the inner wall of the boiler tube or flue to be cut. The guide member and handle is then turned in either direction by means of the handle 36 causing the cutting disk to describe a complete circle and cut the tube or flue.

From the construction defined, it will be seen, that the inclined teeth 20 of the tubular sleeve and the collar or ring 32 will engage the inner wall of the tube or flue and remain stationary while the guide member and handle are being turned by the operator, said sleeve and collar or ring constituting bearings for the guide member to rotate in. The spindle is then turned to the right until the carrier is in inoperative or lowered position, when the device is withdrawn from the tube or flue.

Having thus described my invention, what I claim as new and desire to secure by Letters-Patent is:

1. A tube or flue cutter embracing a tubular guide member having a guide opening leading from its bore and reduced end portions, a tubular sleeve fitted on the outer end portion of the guide member, said sleeve having a series of peripheral teeth formed on its outer face, an annulus mounted for rotation at the inner end of the guide member, the internal diameter of said annulus corresponding with the greatest diameter of said sleeve, a carrier arranged for movement in the guide opening, a cutting disk rotatably mounted in the carrier, a handle fixed to one end of the guide member, means for adjusting the carrier, and yieldable retaining means for the carrier.

2. A device of the character specified, embracing a tubular guide member formed with a guide opening in its wall, a tubular member loosely fitted to one end of the guide member, said tubular member being formed with a series of peripheral teeth, an annulus of greater diameter than the guide member mounted for rotation at the opposite end of the latter, a handle fixed to one end of the guide member, an adjusting spindle having an intermediate outwardly increasing tapered portion for slidably engaging the carrier to adjust it in the guide opening and yieldable retaining means for the carrier.

3. A tube or flue cutter, embracing a tubular guide member having a guide opening leading from its bore and longitudinal slots leading from the wall of its opening, a carrier arranged for movement in the guide opening, an axle extending through the carrier, the ends of the axle projecting beyond the same and fitting in the slots of the guide member, a tubular sleeve formed with a series of peripheral teeth loosely fitted to one end of the guide member, an annulus mounted for rotation at the opposite end of the guide member, said sleeve and annulus constituting bearings for the guide member, a disk fitted at the outer end of the sleeve, an adjusting spindle having a threaded stem to screw through said disk an outwardly increasing and tapered portion at the end of its stem for slidably engaging under the carrier and yieldable retaining means for the carrier.

In testimony whereof I have hereunto set my hand in presence of two subscribing witnesses.

FREDRICH W. PUTSCH.

Witnesses:
A. E. HALSEY,
H. T. WELCH.